United States Patent
Enos et al.

(10) Patent No.: US 7,456,542 B2
(45) Date of Patent: Nov. 25, 2008

(54) INLET GUIDEVANES FOR GENERATOR ROTORS

(75) Inventors: Ronald P. Enos, Melbourne, FL (US); Larry L. Zeller, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 476 days.

(21) Appl. No.: 11/244,740

(22) Filed: Oct. 6, 2005

(65) Prior Publication Data

US 2006/0108892 A1    May 25, 2006

Related U.S. Application Data

(60) Provisional application No. 60/630,621, filed on Nov. 24, 2004.

(51) Int. Cl.
*H02K 9/00*    (2006.01)

(52) U.S. Cl. .......................................... 310/270; 310/52
(58) Field of Classification Search ................. 310/270, 310/42, 52, 55, 56, 58, 59, 60 R, 61–63
See application file for complete search history.

(56) References Cited

U.S. PATENT DOCUMENTS 5,894,178 A * 4/1999 Stefan .......................... 310/61

* cited by examiner

*Primary Examiner*—Dang D Le

(57) ABSTRACT

The present invention provides for a method of installing a guidevane 20 to an end plate 6 that comprises manufacturing a guidevane with at least one tab 30 located on a top length-wise edge of the guidevane and multiple tab slots 32 located on the length-wise edge. Then attaching the guidevane 20 to an end face of an end plate via a fastener that attaches the at least one tab to the end face, and aligning the plurality of tab slots to multiple end plate tabs so that the tab and the tab slots are approximately aligned with the end face of the end plate

8 Claims, 4 Drawing Sheets

INLET GUIDEVANES FOR GENERATOR ROTORS

CROSS-REFERENCE TO RELATED APPLICATIONS

This invention claims priority to U.S. provisional application 60/630,621, filed Nov. 24, 2004, by Enos and Zeller.

FIELD OF THE INVENTION

The field of the invention relates to generator rotors. More specifically, the field of the invention relates to guidevanes for generator rotors.

BACKGROUND

Generators, like those used in the power-generation industry, basically comprise a rotor and a stator. The rotor is attached to a prime mover, such as a steam turbine or gas turbine, which provides mechanical energy to spin the rotor inside of the stator. When the rotor is also provided with an excitation current, electricity is induced in the stator of the generator.

FIG. 1 illustrates cooling in one type of generator rotor. The rotor includes a plurality of slots formed in the body of the rotor. The slots are filled with conductors called rotor coils. At the ends of the rotor, the rotor coils make turns and re-enter the rotor. These turns are called end turns. To prevent the portions of the rotor coils near the ends of the rotor from flying out under centrifugal force, the end turn areas are contained by a retaining ring and end plate assembly.

When the rotor 2 is spinning, cooling gas 4 such as air or hydrogen is drawn into the gap between the rotor shaft and the end plate 6. In the rotor of FIG. 1, the cooling gas passes through the end turns 8 and then exits through exhaust holes in the rotor 10. Also present on the end plate 6 are balance holes 12, which in different types of generators may be a continuous groove in which weights are placed. A number of other cooling arrangements exist. Methods and systems consistent with the present invention are suitable for use with multiple cooling arrangements, as will be understood by one of skill in the art.

In order to improve the flow characteristics of the cooling gas through a rotor, guidevanes may be installed in the generator. Guidevanes help guide the cooling gas that is entering the rotor so that it flows more linearly and is distributed more evenly around the rotor. U.S. Pat. No. 4,547,688, which is incorporated by reference herein in its entirety, illustrates a conventional guidevane that is included as part of a rotor when a generator is manufactured.

FIG. 2 illustrates a guidevane of the prior art. A guidevane 20 is essentially an arc that fits on the inner diameter of the end plate. Typically there are four guidevanes installed around the end plate, however this may be varied. The guidevanes have turning vanes 22 that come within fractions of an inch from the rotor shaft and direct the airflow more efficiently into the rotor. Without guidevanes the airflow into the generator is less efficient and therefore entire efficiency of the generator is reduced.

To attach the guidevanes to the generator, the guidevanes are bolted to the inner circumference of the end plate by means of bolt holes 24 located on the flat surface of the guidevanes. Unfortunately, this arrangement requires complete access to the end plate when the rotor is not yet installed. Also, even when fully accessible, the attachment of the guidevanes can be difficult and time consuming. What is needed is a method and apparatus that can install guidevanes in a more efficient manner, and further can be used with fully assembled generators.

Other difficulties with the prior art also exist, some of which will be apparent upon further reading.

SUMMARY OF THE INVENTION

With the foregoing in mind, methods and apparatuses consistent with the present invention, which inter alia facilitates the attachment of guidevanes to the end plates of generators. The present invention includes guidevanes that have at least one integral tab. Particularly one centrally located tab that extends upwards from a length-wise lip of the base ring. Also along the same lip are at least two tab slots, which in particular flank the integral tab. The integral tab is attached to an end or face of an end plate, and the tab slots are aligned with tabs located on the end plate face.

Unlike guidevanes of the prior art, the guidevanes of the present invention can be easily attached to end plates. Further, they may be attached to assembled generators where the rotor blocks the inner circumference of the end plate. Since as little as one centrally located integral tab is used, and the tab slots may receive but not bind secondary tabs from the end plate, the guidevane is capable of flexing, which accommodates difference of movement when the generator is in operation. Both the fastener that attaches the integral tabs and the secondary tabs may be attached to the end plate via weight gaps, which are either holes or groove(s) on the face of the end plate.

These and other objects, features, and advantages in accordance with the present invention are provided particular embodiments by a method of installing a guidevane to an end plate that comprises manufacturing a guidevane with at least one tab located on a top length-wise edge of the guidevane and multiple tab slots located on the length-wise edge. Then attaching the guidevane to an end face of an end plate via a fastener that attaches the at least one tab to the end face, and aligning the plurality of tab slots to multiple end plate tabs so that the tab and the tab slots are approximately aligned with the end face of the end plate.

In another embodiment the present invention provides for a guidevane for retrofitting a generator, the generator including a rotor having end windings retained by a retaining ring and an end plate, the guidevane that comprises a base ring for attaching the guidevane to the endplate, the base ring having a lip on one edge. Also there is an integral tab formed in the base ring and positioned substantially at the center of the base ring an extending above the top surface of the base ring and multiple slots formed in the base ring, configured to accept matching detached tabs. The position of the integral tab match the position of pre-existing weight gaps in the end plate; weight gaps being holes, slots or other weight holding arrangements.

In still another embodiment the present invention provides for a guidevane and end plate assembly that comprises at least one tab located on a top length-wise edge of the guidevane. Also multiple tab slots are located on the length-wise edge of the guidevane, and multiple end plate tabs located on an end of the end plate and extending below an inner circumference of the end plate and aligning with the tab slots located on the length-wise edge of the guidevane. There is least one fastener, the fastener attaches the at least one tab to the end of the end plate, the length-wise edge of the guidevane is essentially flush with the end of the end plate. The tab and the tab slots are part of an edge lip on the guidevane.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for guidevanes that can be installed onto end plates of a generator in a quick and efficient manner. Further, the guidevanes of the present invention can be installed onto fully assembled generators. Guidevanes of the prior art cannot be installed onto fully assembled generators since the rotor blocks the inner circumference of the end plate. The guidevane of the present invention is fitted between the endplate and rotor, but uses multiple tabs that attach to the end facing of the end plate. These tabs can be accessed on fully assembled generators, and further are quickly and easily installed even on partially assembled generators.

Figure 1:
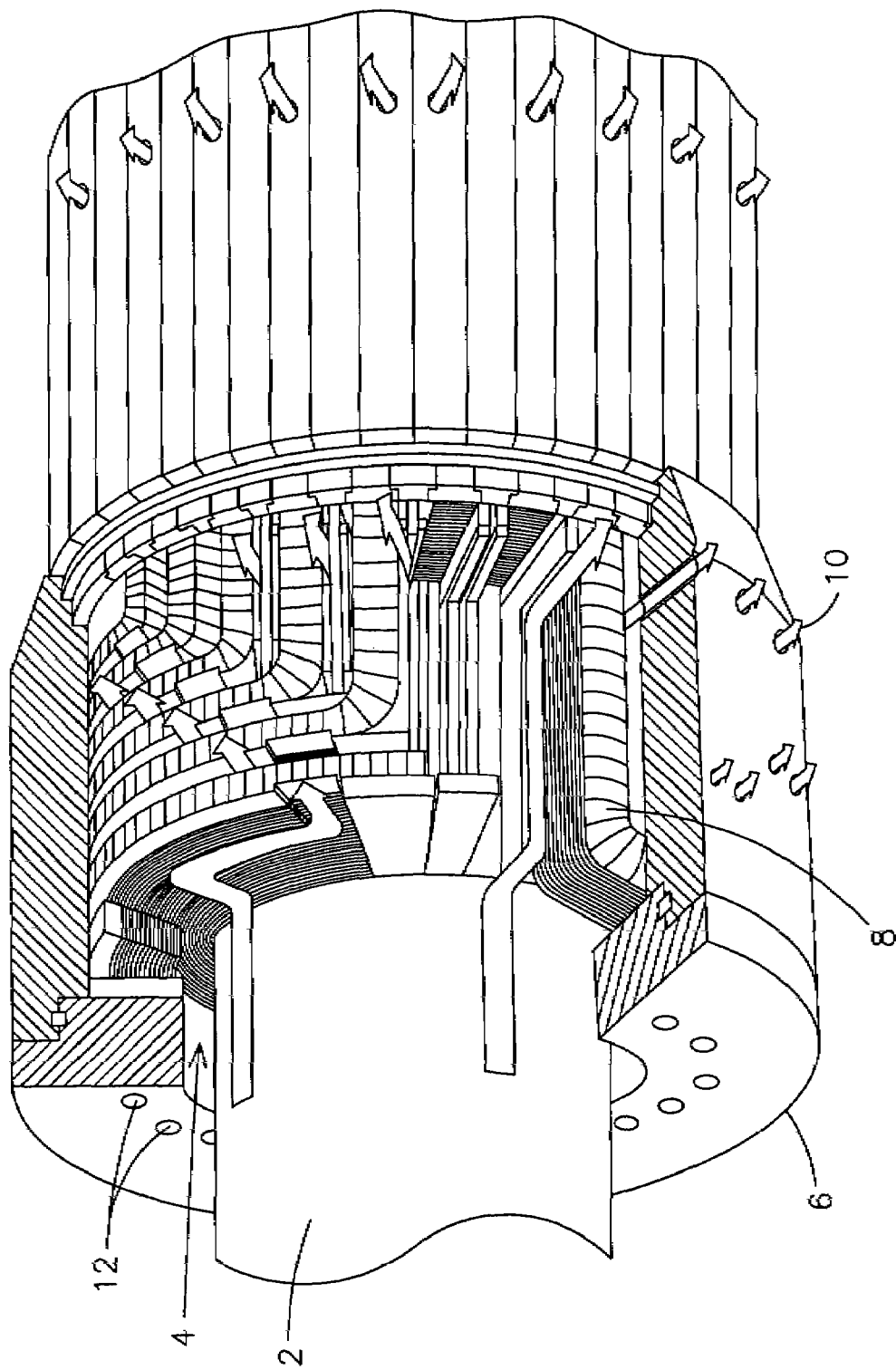
FIG. 1 illustrates airflow into a typical generator.
Figure 2:
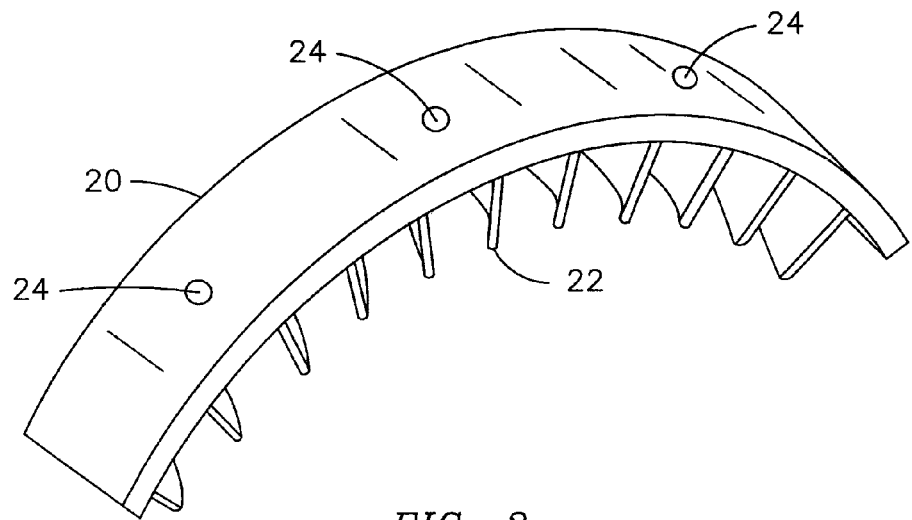
FIG. 2 illustrates a guidevane of the prior art.
Figure 3:
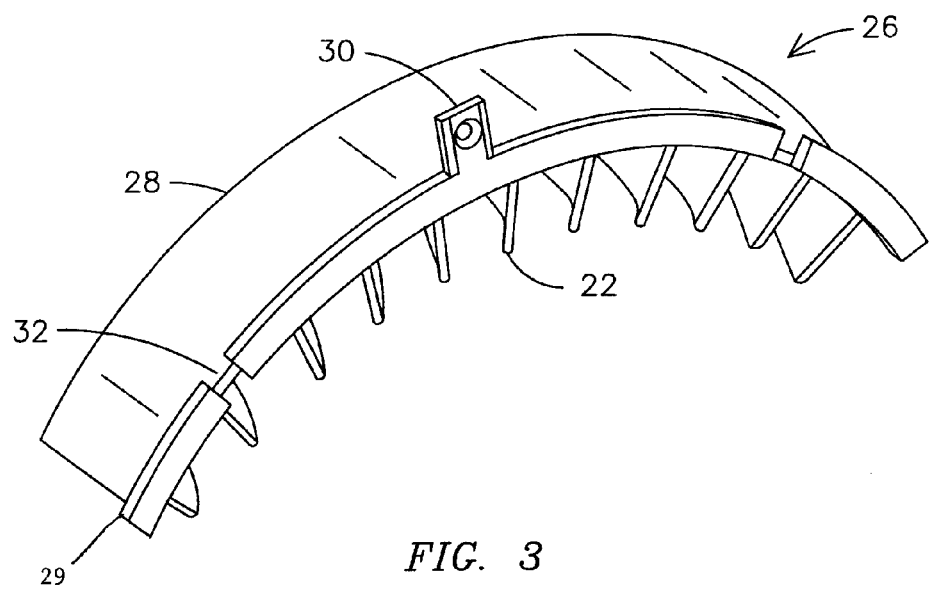
FIG. 3 illustrates a guidevane according to one embodiment of the present invention.

FIG. 3 illustrates a single section of a retrofit guidevane consistent with an exemplary embodiment of the invention. The guidevane 26 includes an airfoil comprising a row of turning vanes 22. The turning vanes are size based on the generator rotor size and frequency, as is understood by one skilled in the art. The airfoil is mounted to or constructed as part of a base ring 28. The base ring bears the centrifugal load on the guidevanes caused by the radiation of the rotor. The base ring has a lip 29 on one leading edge. The lip includes at least one tab 30 and two or more tab slots 32 as part of a edge lip. It is also possible for guidevanes of the present invention to contain bolt holes like those found in the prior art.

The tab 30 attaches to the outer face, or end, of an end plate. This may be done by a variety of means known in art, but a particular embodiment uses the balance holes or grooves present on end of the end plate. Weights that are inserted used in conjunction with grooves may in fact be modified to receive the attachment of the tab, thereby minimizing the impact that installing the guidevane has on the generator. The tab slots 32 match up to tabs that are attached to the end of the end plate. The end plate tabs may be installed after the guidevane is initially attached by the tab 30 to ensure optimal fit. The end plate tabs that fit into the guidevane's tab slots 32 can be physically bonded in the tab slots, but do not need to be.

The initial tab 30 holds the guidevane in place when the generator is turned off or is operating at low speeds. As the generator increases operation and the guidevane is forced outwards against the inner circumference of the end plate, the tab slots 32 that receive tabs from the end plate give the guidevane further support prevent any twisting. Although multiple tabs 30 may be used, particular embodiments only have a single, centrally located tab 30. Unlike the multiple bolt configuration of the prior art, using only a single, centrally located tab allows for greater flexibility of the guidevane which in turn reduces stresses. As centrifugal forces act to push the guidevane outwards against the end plate, having only a single point of fixed attachment allows for difference of movement without undue stressing.

Figure 4:
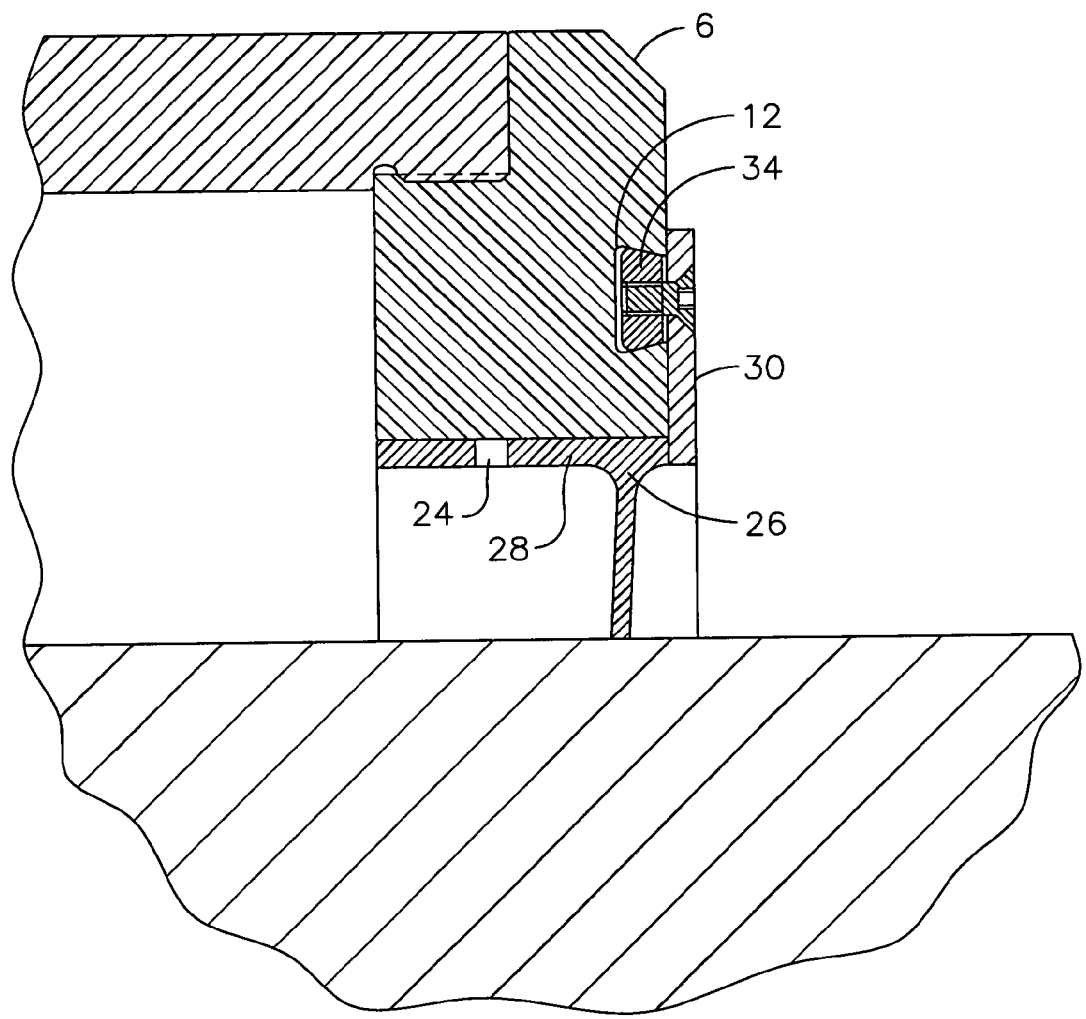
FIG. 4 illustrates a cross-sectional view of a guidevane attached to an endplate according to one embodiment of the present invention.

FIG. 4 illustrates cross sectional view the installation of a guidevane consistent with the exemplary embodiment on a pre-existing end plate. The guidevane 26 is positioned so that its base ring 28 is in contact with the bottom surface of the end plate 6 and its lip is in contact with the front surface of the end plate. The position of the guidevane is adjusted so that the hole in the tab 30 aligns with a pre-existing balance groove or hole 12 in the end plate. A fastener 34 is used to fixedly attach the guidevane to the end plate. The fastener fits into the groove and may in fact be a modified weight. A bolt hole 24 of the prior art may also be included.

Figure 5:
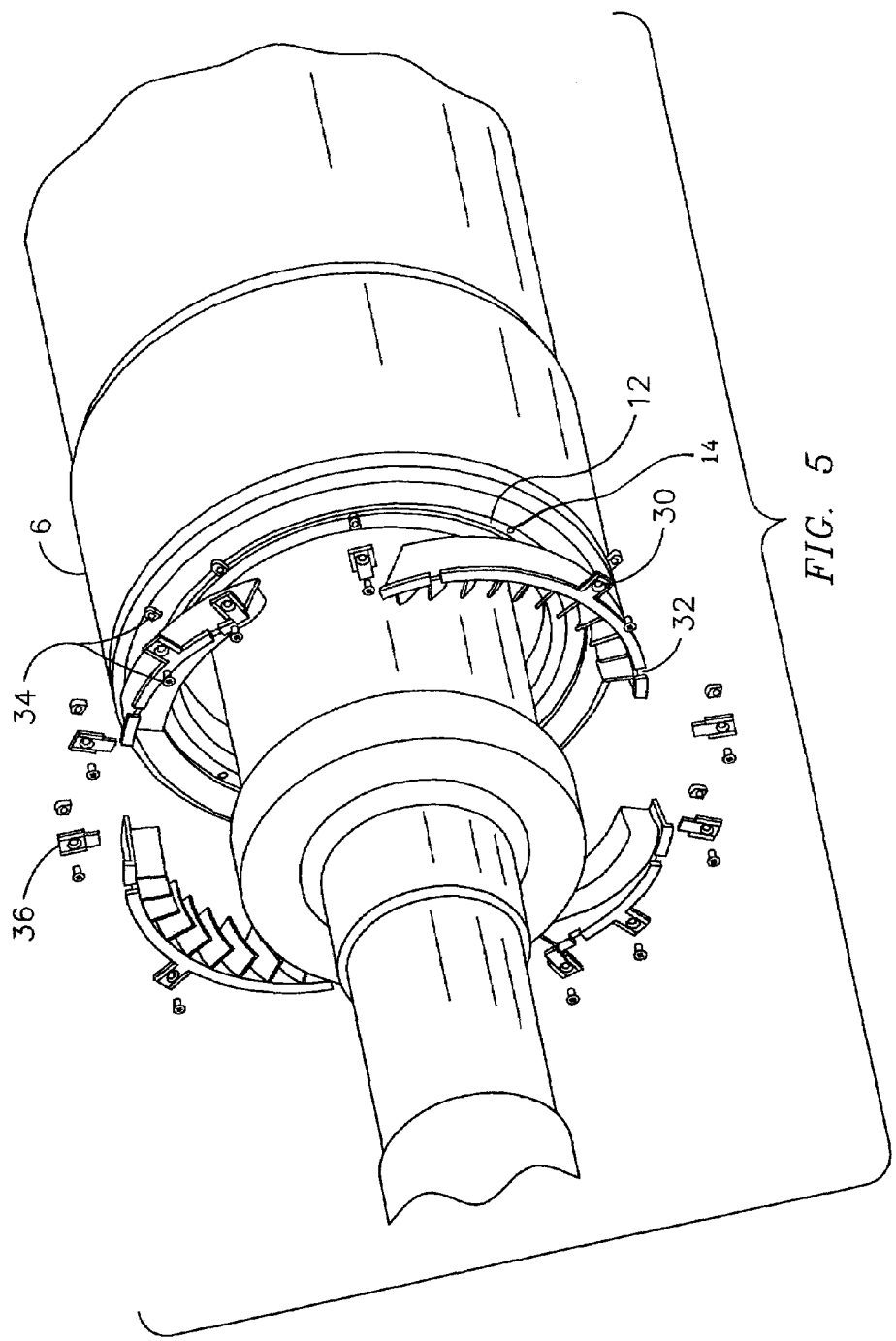
FIG. 5 illustrates an exploded view of multiple guidevanes being attached to a generator according to one embodiment of the present invention.

As shown in FIG. 5, detached tabs 36 (which may be similar in size and shape to the integral tabs 30, but not formed as part of the base ring) are positioned at the tab slots 32 in the base ring. Fasteners 34 are used to fixedly-attach the detached tabs to pre-existing balance grooves or holes 12 in the end plate 6. Use of detached tabs for some of the mounting accommadates cetrifugal loads on the base ring by permitting expansion of the base ring relative to the detached tabs.

Referring to FIG. 5, an exploded view of a guidevane being attached to a generator according to one embodiment of the present invention is shown. Here the end plate 6 has a uniform groove 12 on its face, to which fastener that connect the tabs 30 are attached. As discussed, holes or grooves are necessary in and end plate, and it is a particular embodiment of the invention to use the holes or grooves to fasten the guidevanes to the end plate. The fasteners 34 may also be used to secure detachable tabs 36 to the end plate. These tabs fit into the guidevane's tab slots 32. As illustrated here, these tabs may be detachable from the end plate, and need not be fastened directly to the guidevanes. In exemplary embodiments, like that illustrated, each guidevane has two tab slots, positioned about 30° off of center.

As discussed, many existing generators in the field do not have guidevanes. As a result, the flow characteristics of the cooling gas in these generators may be asymmetric, which may cause thermal imbalance in the rotor. Methods and systems consistent with the present invention enable a pre-existing generator in the field to be retrofitted with guidevanes.

In one embodiment the present invention provides for a method of installing a guidevane to an end plate that comprises manufacturing a guidevane with at least one tab located on a top length-wise edge of the guidevane and multiple tab slots located on the length-wise edge. Then attaching the guidevane to an end face of an end plate via a fastener that attaches the at least one tab to the end face, and aligning the plurality of tab slots to multiple end plates tabs 36 so that the tab and the tab slots are appoximately aligned with the end face of the end plate.

In particular embodiments the present invention provides one centrally located tab that is present on the top length-wise edge of the guidevane. The fastener may attach through the tab and into at least one of a weight hole and groove on the end face of the end plate, and in particular there are two tab slots are located on the length-wise edge, which may be are located approximately 30° to either side of center.

In other embodiments the guidevane are attached to the endplate by bolting the top of the guidevane to the inner diameter of the endplate. The fastener may also be part of an end plate weight.

In another embodiment the present invention provides for a guidevane for retrofitting a generator, the generator including a rotor having end windings retained by retaining ring and an end plate, the guidevane that comprises a base ring for attaching the guidevane to the endplate, the base ring having a lip on one edge. Also there is an integral tab formed in the base ring and positioned substantially at the center of the base ring an extending above the top surface of the base ring and multiple slots formed in the base ring, configured to accept matching detached tabs. The position of the integral tab match the position of pre-existing weight gaps 14 in the end plate; weight gaps being holes, slots or other weight holding arrangements.

In still another embodiment the present invention provides for a guidevane and end plate assembly that comprises at least one tab located on a top length-wise edge of the guidevane. Also multiple tab slots are located on the length-wise edge of the guidevane, and multiple end plate tabs located on an end of the end plate and extending below an inner circumference of the end plate and aligning with the tab slots located on the length-wise edge of the guidevane. There is least one fastener, the fastener attaches the at least one tab to the end of the end plate, the length-wise edge of the guidevane is essentially flush with the end of the end plate. The tab and the tab slots are part of an edge lip on the guidevane.

In particular embodiments the end plate tabs are fixedly attached to the end plate. The end plate tabs may be attached to the end plate by secondary fasteners held to at least one of a weight hole and groove. Two tab slots are located on the length-wise edge of the guidevane and two corresponding end plate tabs located on the end plate, and the tab slots can be located approximately 30° to either side of center of the guidevane.

In other particular embodiments, the at least one fastener is held to at least one of a weight hole and groove in the end plate. A single tab is located on the guidevane, and the single tab is centrally located along the length-wise edge.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A guidevane and end plate assembly comprising:
   at least one tab located on a top length-wise edge of said guidevane;
   a plurality of tab slots located on said length-wise edge of said guidevane;
   a plurality of end plate tabs extending below an inner circumference of said end plate and aligning with said tab slots located on said length-wise edge of said guidevane; and
   at least one fastener, wherein said fastener attaches said at least one tab to said end of said end plate, wherein said length-wise edge of said guidevane is essentially flush with said end of said end plate;
   wherein said tab and said tab slots are part of an edge lip on said guidevane.

2. The guidevane of claim 1, wherein said end plate tabs are fixedly attached to said end plate.

3. The guidevane of claim 1, wherein said end plate tabs are attached to said end plate by secondary fasteners held to at least one of a weight hole and groove.

4. The guidevane of claim 1, wherein two tab slots are located on said length-wise edge of said guidevane and two corresponding end plate tabs located on said end plate.

5. The guidevane of claim 4, wherein said tab slots are located approximately 30° to either side of center of said guidevane.

6. The guidevane of claim 1, wherein said at least one fastener is held to at least one of a weight hole and groove in said end plate.

7. The guidevane of claim 1, wherein a single tab is located on said guidevane.

8. The guidevane of claim 7, wherein said single tab is centrally located along said length-wise edge.

\* \* \* \* \*